US006944389B2

(12) United States Patent
Giraud et al.

(10) Patent No.: US 6,944,389 B2
(45) Date of Patent: Sep. 13, 2005

(54) CONNECTOR HOUSING HAVING A SLIDING TRAY WITH A HINGEABLE PORTION

(75) Inventors: William J M Giraud, Springtown, TX (US); Andrew G. Stanush, Fort Worth, TX (US); Terry L. Cooke, Hickory, NC (US); John B. Johnson, Hickory, NC (US)

(73) Assignee: Corning Cable Systems LLC, Hickory, NC (US)

( * ) Notice: Subject to any disclaimer, the term of this patent is extended or adjusted under 35 U.S.C. 154(b) by 0 days.

(21) Appl. No.: 10/903,127

(22) Filed: Jul. 30, 2004

(65) Prior Publication Data

US 2005/0111809 A1    May 26, 2005

Related U.S. Application Data

(63) Continuation-in-part of application No. 10/724,510, filed on Nov. 26, 2003.

(51) Int. Cl.[7] .................................................. G02B 6/00
(52) U.S. Cl. ..................................... 385/135; 385/134
(58) Field of Search ............................... 385/134–135, 385/88–89, 92; 312/330.1, 331, 334.1, 334.7, 312/334.8, 334.44, 348.3

(56) References Cited

U.S. PATENT DOCUMENTS

| | | | |
|---|---|---|---|
| 4,792,203 A | 12/1988 | Nelson et al. ............. | 350/96.2 |
| 4,900,123 A | 2/1990 | Barlow et al. ............. | 350/96.2 |
| 5,066,149 A | 11/1991 | Wheeler et al. ............ | 385/135 |
| 5,071,211 A * | 12/1991 | Debortoli et al. ............. | 385/76 |
| 5,142,607 A * | 8/1992 | Petrotta et al. ............. | 385/135 |
| 5,490,229 A * | 2/1996 | Ghandeharizadeh et al. ......................... | 385/135 |
| 5,742,982 A | 4/1998 | Dodd et al. ................... | 24/16 |
| 5,778,130 A | 7/1998 | Walters et al. ............. | 385/134 |
| 5,825,962 A * | 10/1998 | Walters et al. ............. | 385/135 |
| 5,946,440 A | 8/1999 | Puetz .......................... | 385/135 |
| 5,987,207 A | 11/1999 | Hoke .......................... | 385/135 |
| 6,438,310 B1 | 8/2002 | Lance et al. ................ | 385/135 |
| 6,504,988 B1 | 1/2003 | Trebesch et al. ............ | 385/135 |
| 6,748,155 B2 | 6/2004 | Kim et al. ................... | 385/135 |

* cited by examiner

*Primary Examiner*—Frank G. Font
*Assistant Examiner*—Ryan Lepisto
(74) *Attorney, Agent, or Firm*—Michael E. Carroll, Jr.

(57) ABSTRACT

A connector housing includes a housing assembly and a tray assembly. The tray assembly being slidably mounted relative to the housing assembly and having a first position within the housing assembly so that the tray assembly is fully inserted within the housing assembly in a stored position. The tray assembly also has a first position beyond an interior of the housing assembly. In the first position, a first portion of a tray of the tray assembly is rotatable relative to a second portion of the tray at a hingeable section of the tray, thereby allowing easier access to components, connections, and/or cables on the tray. In another embodiment, the tray assembly is slidable into a rearward position beyond the interior of the housing assembly.

33 Claims, 10 Drawing Sheets

CONNECTOR HOUSING HAVING A SLIDING TRAY WITH A HINGEABLE PORTION

RELATED APPLICATIONS

The present application is a Continuation-In-Part (CIP) of U.S. Ser. No. 10/724,510 filed on Nov. 26, 2003, the disclosure of which is incorporated herein in its entirety by reference.

FIELD OF THE INVENTION

The present invention relates generally to a connector housing for organizing, routing, and storing optical connections such as splices and/or connectors between optical waveguides. More specifically, the invention may include among other features a connector housing having a tray that is slidable with a first portion of the tray that hinges with respect to a second portion of the tray. Additionally, the tray is also capable of sliding into both a forward and a rearward position with respect to the housing assembly, thereby allowing the craftsman easy access to optical components and hardware attached to the tray from both the front and rear.

BACKGROUND OF THE INVENTION

In telecommunication infrastructure installations, equipment for switching, cross-connecting and inter-connecting a variety of devices are used. Many of these devices are installed in telecommunication equipment racks, thereby permitting organized, high-density installations in a limited space. For instance, connector housings are installed in telecommunication equipment racks to allow the craftsman access to multiple connections at a single point. Connector housings allow the craftsman to perform necessary maintenance and/or reconfigure the communication network as necessary. It is desirable to have a high density of connections in a given space while still allowing the craftsman easy access, organization, and handling of connections and cables leading to and within the connector housing.

DETAILED DESCRIPTION OF THE INVENTION

Figure 1:
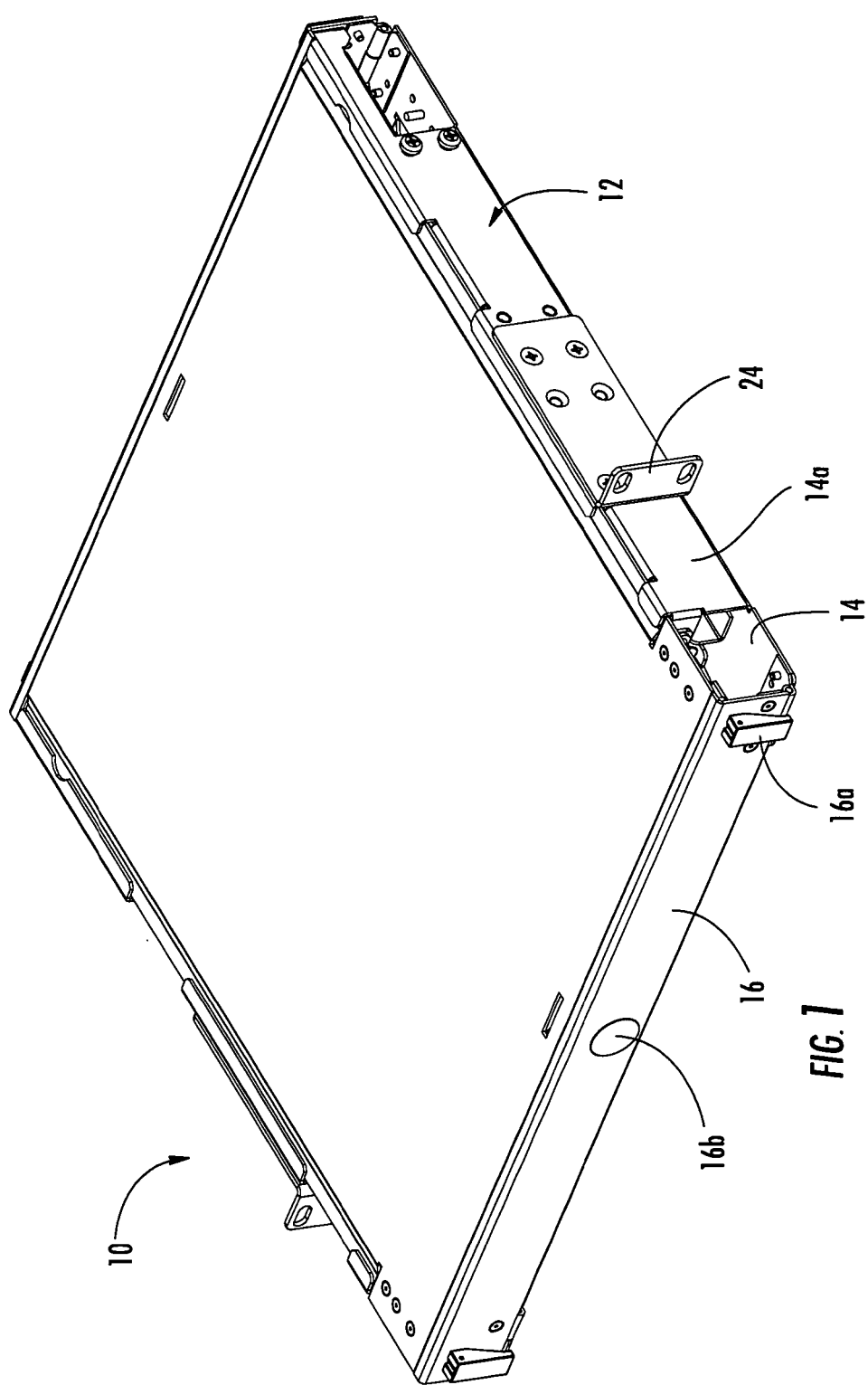
FIG. 1 is a front perspective view of a connector housing according to one embodiment of the present invention.
Figure 2:
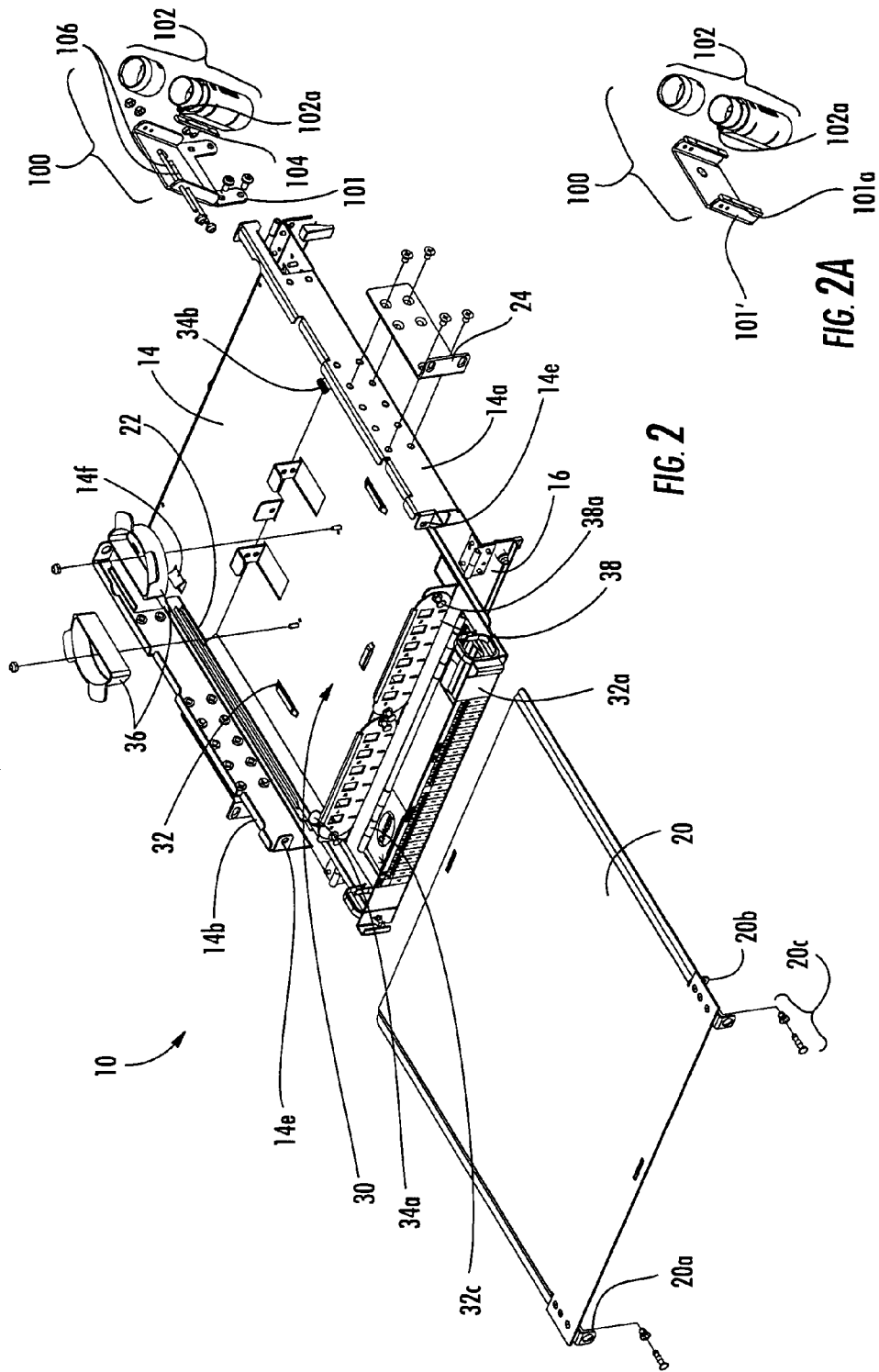
FIG. 2 is a front partially exploded, partially perspective view of the connector housing of FIG. 1.
Figure 6:
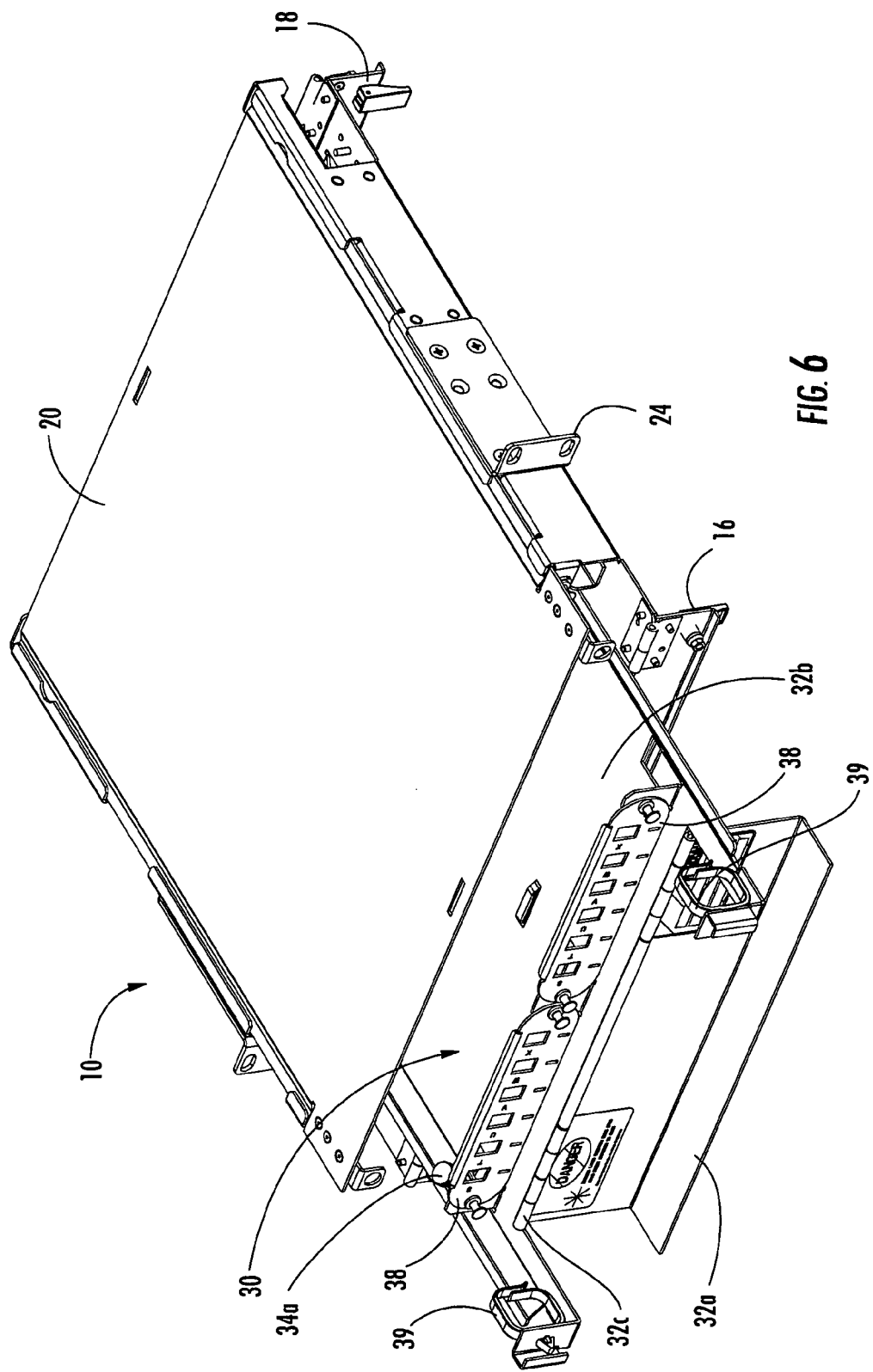
FIG. 6 is a front perspective view of the connector housing of FIG. 1 with the tray assembly slid into a second forward position along with a portion of the tray hinged downward.

Illustrated in FIGS. 1 and 2 is an exemplary connector housing 10 according to the present invention. Connector housing 10 is typically mounted to a distribution frame (not shown) and used for organizing, routing, and storing optical connections and cables of a communication network. FIG. 2 shows connector housing 10 with a cable entry bracket assembly 100 and a furcation plug 102 of a cable assembly (not shown). Connector housing 10 includes a housing assembly 12 and a tray assembly 30 being slidably mounted to housing assembly 12 so that the craftsman can access optical components, cables, and/or hardware attached to and/or disposed on tray assembly 30. As depicted and best shown in FIG. 2, housing assembly 12 includes a bottom panel 14 having integrally formed sides 14a,14b, a front panel 16, a rear panel 18, a top panel 20, a pair of tray slides 22, and a pair of rack mounts 24. The panels and sides of housing assembly generally define an interior space of connector housing 10. Tray assembly 30 includes a tray 32 having a plurality of tray locks 34a,34b, a plurality of slack cable storage devices 36, a plurality of adapter panels 38, and at least one cable routing guide 39. In addition to sliding, a first portion 32a of tray 32 also hinges relative to a second portion 32b of tray 32 as best shown in FIG. 6, thereby allowing improved access for the craftsman. Of course, other configurations of the tray assembly and/or connector housing are possible.

Figure 3:
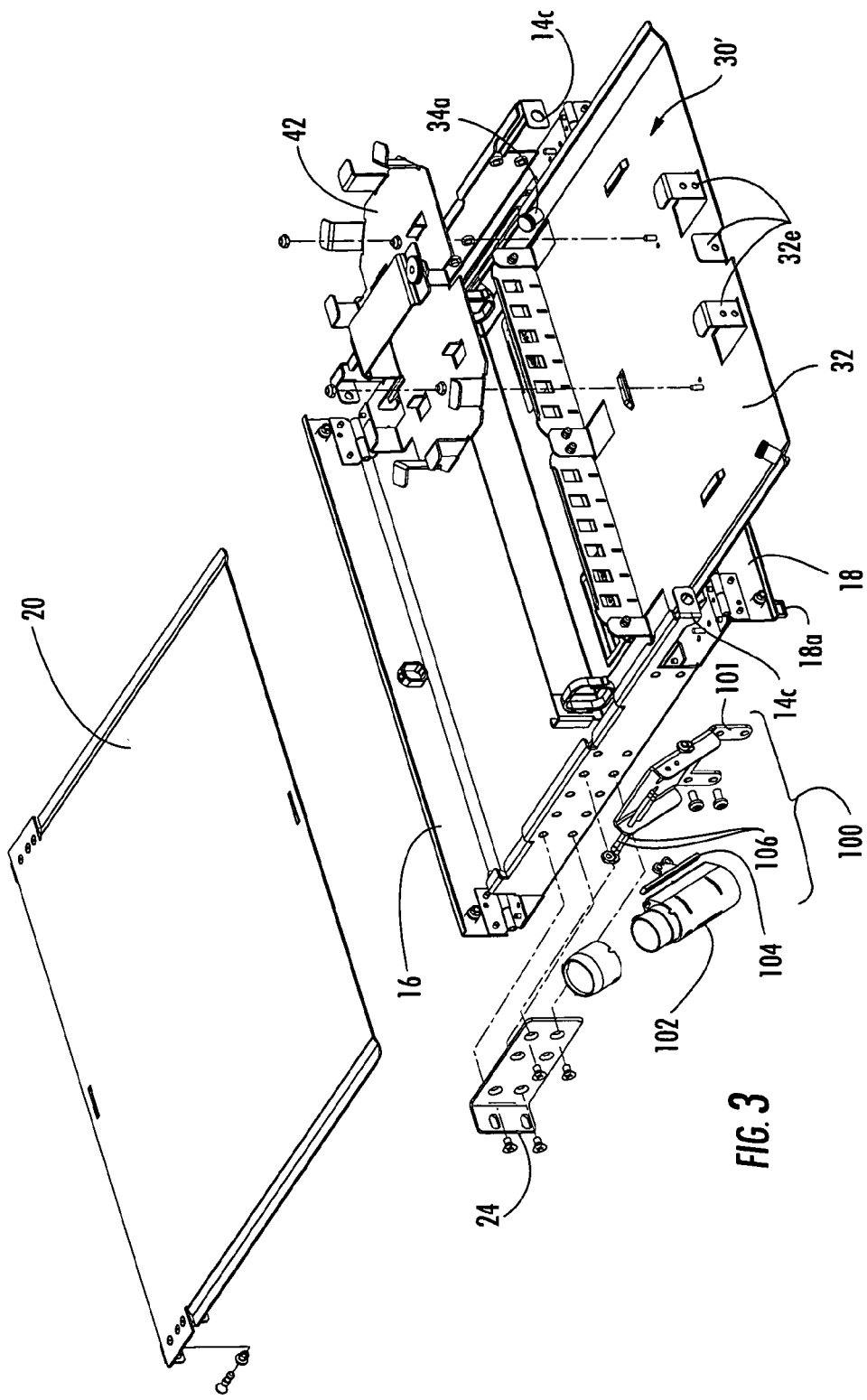
FIG. 3 is a rear partially exploded, partially perspective view of a connector housing of another embodiment of the present invention.

As best shown in FIGS. 2 and 3, cable entry bracket assembly 100 includes a cable entry bracket 101, at least one furcation plug 102 that forms a portion of a cable assembly (not shown), at least mounting rail 104, and at least one mounting hardware 106. Generally speaking, furcation plug 102 is a portion of the cable assembly and may form the transition point where a larger cable is furcated into a plurality of units having fewer optical waveguides than the entirety of the larger cable. Furcation plug 102 has a grooved portion 102a that generally runs along a portion of a longitudinal length of furcation plug 102. Grooved portion 102a cooperates with a mounting rail 104 that is sized for allowing grooved portion 102a to slide snuggly thereon. Mounting rail 104 also includes a tab portion 104a having a pair of apertures (not numbered) for securing the same to cable entry bracket 101. Thus, furcation plug 102 of the cable assembly is quickly and easily mounted and/or removed from mounting rail 104 by the craftsman without tools. Mounting rail 104 is attached to cable entry bracket 101 using suitable mounting hardware 106. For instance, mounting hardware 106 is a pair of threaded studs and nuts; however, other suitable mounting hardware is possible such as bolts and nuts. In this case, the studs are inserted through apertures in cable entry bracket 101 having a predetermined spacing that matches the spacing of the apertures in tab 104a as shown and secured on each end with nuts. Additionally, cable entry bracket 101 can be configured for mounting more than one furcation plug 102. Other configuration are also possible for instance it is possible to eliminate mounting rail 104 by forming a cable entry bracket having a integrated rail thereon.

FIG. 3 depicts tray assembly 30' that replaces the slack cable storage devices 36 of FIG. 2 with a bracket assembly 42 for securing splice trays (not shown) to tray assembly 30'. In this configuration it is possible to route optical fiber cables into the connector housing for fusion splicing and storage of the splices within the splice trays. Furthermore, connector housing 10 is adaptable in other ways. As depicted in FIG. 2, the projection of connector housing 10 from the distribution frame can be varied by moving rack mounts 24 into different mounting positions along sides 14a,14b using the plurality of threaded bores (not numbered) thereon.

Figure 4:
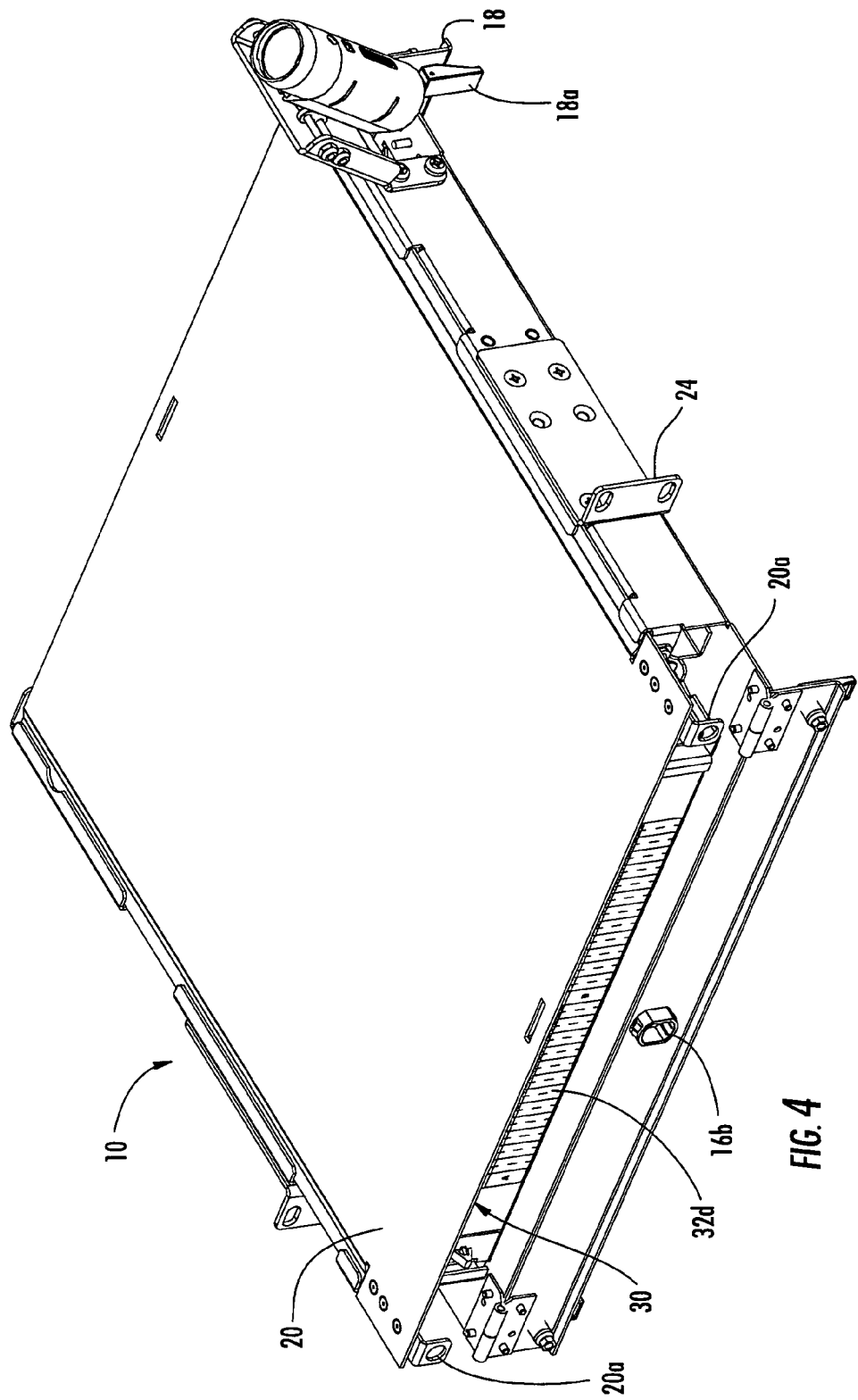
FIG. 4 is a front perspective view of the connector housing of FIG. 1 shown with the front and the rear panels of the housing rotated into the open positions with the tray assembly in a stored position.

The present invention is also advantageous because the craftsman can slide tray assembly 30 into a plurality of lockable positions for accessing hardware, cables and/or components thereon. As best shown by FIGS. 4–7, tray assembly 30 has four different positions relative to housing assembly 12. More specifically, tray assembly 30 has a storage position as shown in FIG. 4 where the tray assembly 30 is disposed within connector housing 12, a first forward lockable position shown in FIG. 5, a second forward lockable position shown in FIG. 6, and a rearward lockable position shown in FIG. 7.

FIG. 4 depicts connector housing 10 with both front panel 16 and rear panel 18 hinged downward into their respective open positions. Specifically, a pair of respective latches 16a,18a on front and rear panels 16,18 are moved to an open position so that panels may be hinged into the open position. In this case, latches 16a,18a are quick release latches; however, any other suitable means such quarter-turn locks, screws, or slide latches are possible. Latches 16a engage respective tabs 20a of top panel 20 and latches 18a engage respective tabs 14c disposed at the rear of respective sides 14a,14b as shown in FIG. 3. Additionally, front panel 16 may include an aperture having an insert 16b that is removable so that an optional locking mechanism (not shown) may be attached, thereby restricting access of connector housing 10 to authorized personnel. Likewise, rear panel 18 may also have an aperture with an insert (not visible) for receiving a locking mechanism. With the front panel 16 open, tray assembly can be viewed in the stored position within housing assembly 12.

Figure 5:
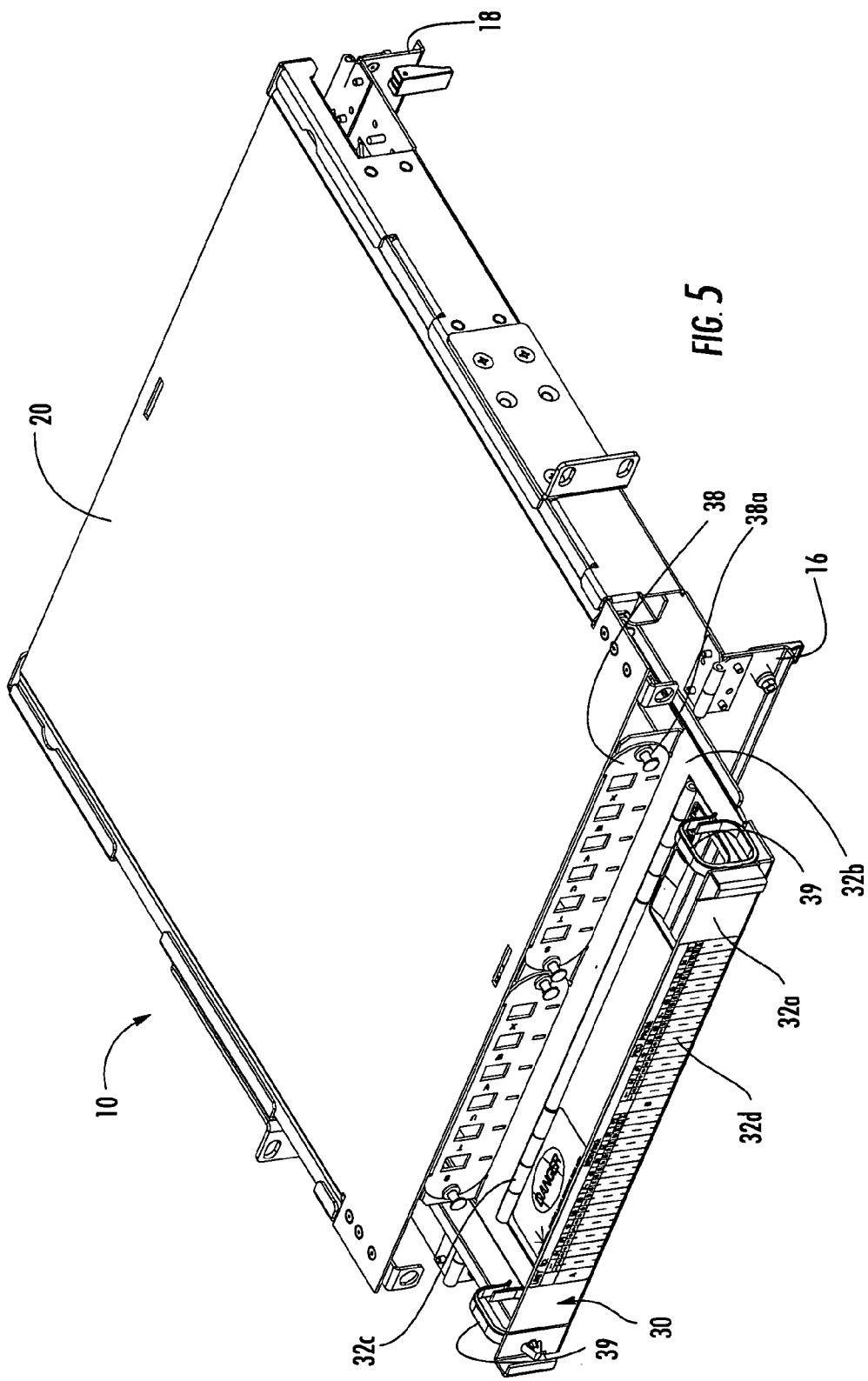
FIG. 5 is a front perspective view of the connector housing of FIG. 1 with the tray assembly slid into a first forward position.

From the stored position in FIG. 4, tray assembly 30 and is free to slide towards a first position forward of front panel 16 so that the front of adapter panels 38 on tray assembly 32 are accessible as shown in FIG. 5. However, tray assembly 30 is prevented from moving further forward by tray lock 34a, which engages a first stop 14d (FIG. 7) on bottom panel 14. Tray assembly 30 stops so that adapter panels 38, which hold a plurality of adapters (not shown) used for mating optical connectors for making the desired connections between optical fibers, is about flush with the front of housing assembly 12. Adapter panels 38 are secured in position and easily removed from tray 32 using a pair of fasteners 38a such as push pin fasteners, but other suitable fasteners are possible. The front of tray 32 may also include a decal 32d so that the craftsman can record the interconnection of links in the communication network. The front of tray 32 may also have one or more cable routing guides 39 for organizing and routing cables into the front of connector housing 10 and to adapters (not shown) attached to adapter panels 38. From the first forward position of FIG. 5, it is possible to move tray assembly 30 to the second position forward of front panel 16 so that the rear side of adapter panels 38 mounted on tray assembly 32 are also accessible as shown in FIG. 6. In order to move tray assembly 30 to the second forward position, tray lock 34a must be released over the first stop while moving tray assembly 30 forward at the same time. Tray assembly 30 can continue to move forward until it reaches the second forward position at which point it is prevented from moving further forward by tray lock 34b, which engages a second stop (not visible) on bottom panel 14.

As depicted in FIG. 6, tray 32 also includes another advantageous feature. Specifically, besides being slidable in both the forward and rearward directions, first portion 32a of tray 32 is rotatable relative to second portion 32b of tray 32 when tray assembly 30 is in the second forward position. In other words, tray 32 has a hingeable portion 32c between first and second portions 32a,32b. Since first portion 32a of tray 32 can be rotated, the craftsman can more easily access the connectors inserted to the portion of the adapters located on the backside of adapter panels 38a without removing the adapter panel 38a. Moreover, if connector housing 10 is mounted relatively high on the distribution rack, it is easier for the craftsman to reach into connector housing 10 since first portion 32a of tray 32 can be rotated out of the way. As depicted, first portion 32a is free to rotate driven by gravity as tray 32 is pulled forward. As tray 32 is pushed into housing assembly 12 first portion 32a is pushed upward by bottom panel 14. However, in other embodiments tray 32 can include a mechanism for locking first portion 32a in position so that it would not be free to rotate until it was unlocked.

Additionally, from the second forward position, if the second tray lock 34b is released over the second stop and moved forward it is possible to remove it from housing assembly 12. From the second forward position, tray assembly 30 is movable to the stored position of FIG. 4 by having the craftsman merely push tray assembly 30 backwards into housing assembly 12 until tray lock 34a contacts the storage stop (not visible) on disposed on bottom panel 14 indicating that tray assembly 30 is in the storage position.

Figure 7:
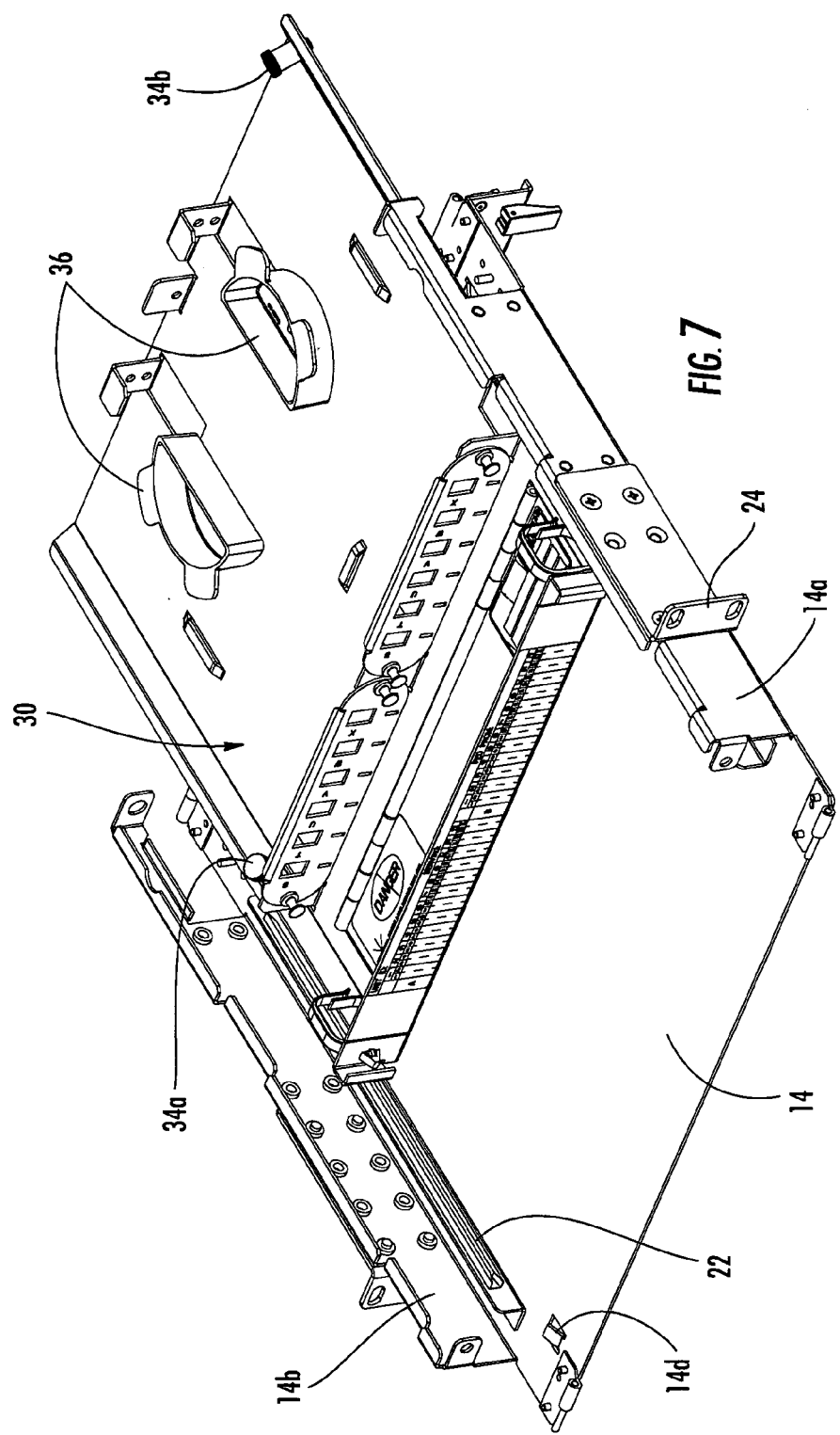
FIG. 7 is a front perspective view of the connector housing with the front and top panels of the housing assembly removed and the tray assembly slid into a rearward position.

As shown in FIG. 7, connector housing 10 of the present invention is advantageous because tray assembly 30 can move in a rearward direction beyond rear panel 18, thereby allowing the craftsman easy access to tray assembly 30 and components thereon from the rear of connector housing 10. Specifically, FIG. 7 shows a perspective view of connector housing 10 having front panel 16 and top panel 20 removed for clarity. Moreover, top panel 20 is quickly and easily removed from housing assembly 12, even when installed in a rack, by disengaging a plurality of fasteners 20c such as push pin fasteners that are disposed on tabs 20b of top panel 20 that engage apertures 14e on sides 14a,14b. Thereafter, top panel 20 is free to slide forward through guides (not numbered) on sides 14a,14b until top panel 20 is removed. Likewise, front panel 16 and rear panel 18 are easily removed from connector housing 12 by simply open the panels and sliding the same off the hinges mounted to the bottom panel 14.

Figure 8:
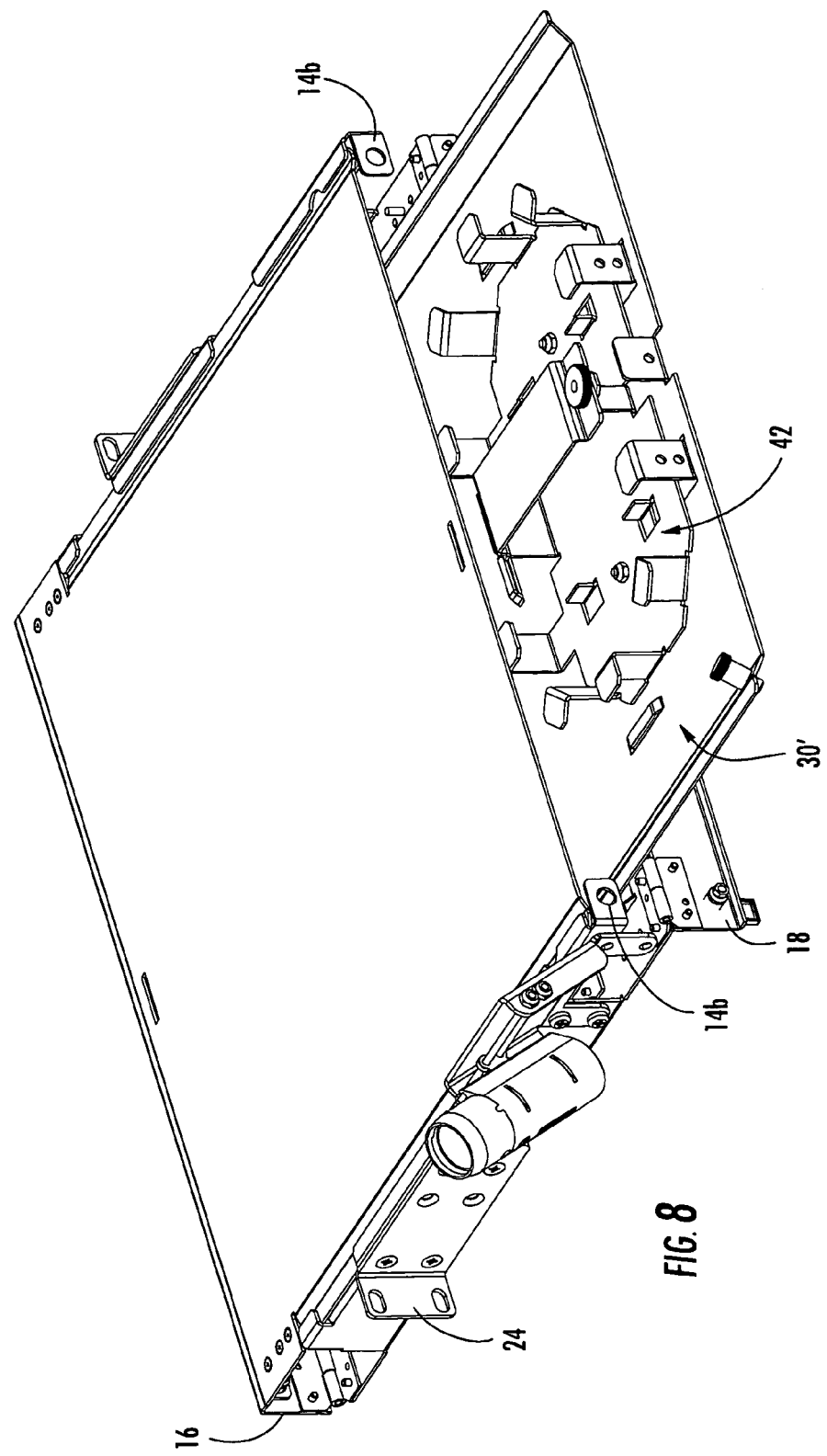
FIG. 8 is an assembled rear perspective view of the embodiment of FIG. 3 with the tray slid into a rearward position.
Figure 10:
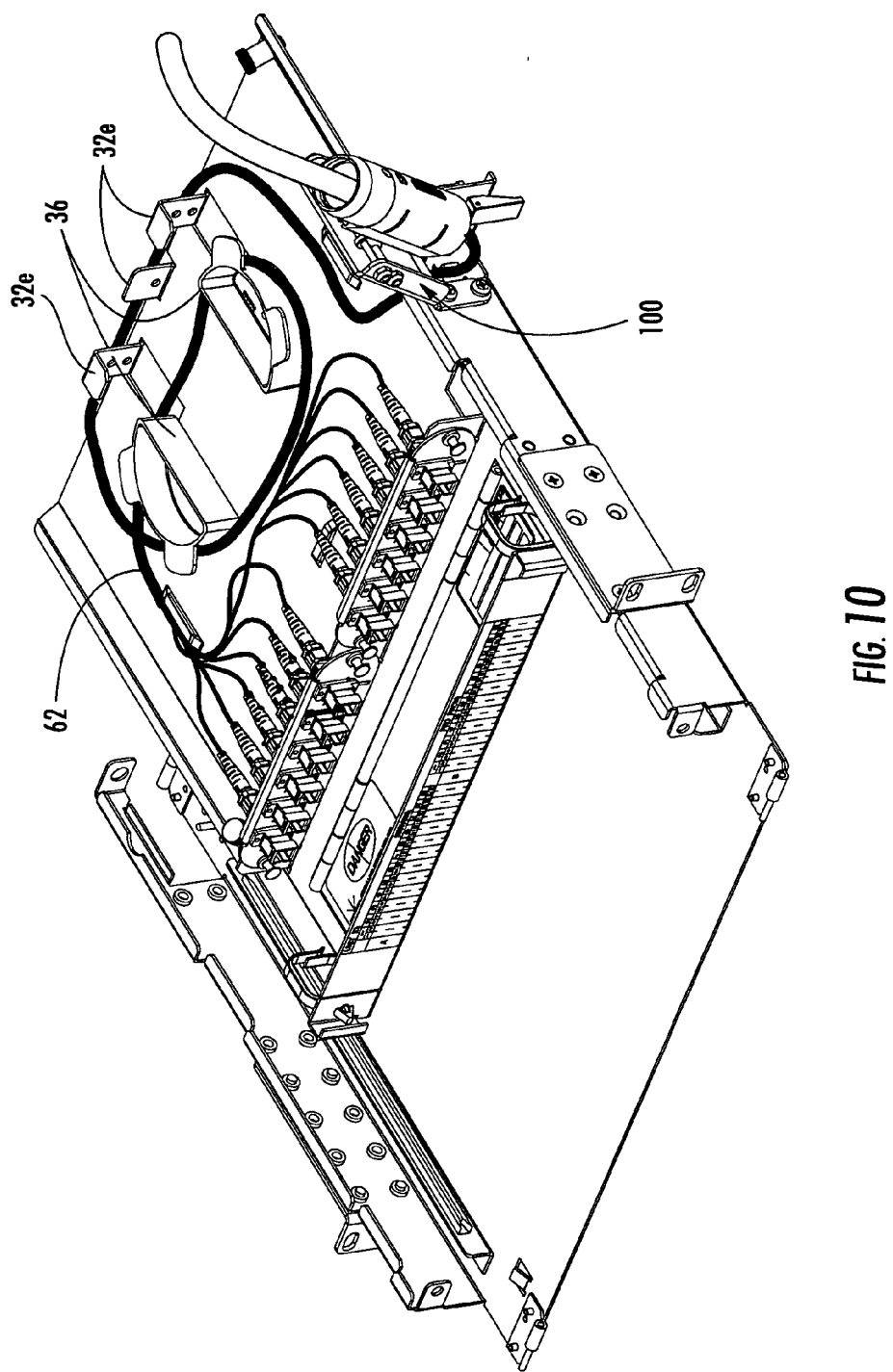
FIG. 10 is a front perspective view of the connector housing having the front and top panels of the housing assembly removed and depicting a cable assembly entering the connector housing.

From the stored position in FIG. 4, tray assembly 30 and is slidable towards a rearward position forward of rear panel 18 by releasing tray lock 34b over a third stop (not numbered) on bottom panel 14 while moving tray assembly 30 rearward at the same time. Tray assembly 30 can continue moving rearward until tray lock 34a engages a fourth stop 14f (FIG. 2) on bottom panel 14. Additionally, from this rearward position, if first tray lock 34a is released over the fourth stop and moved rearward it is possible to remove tray assembly 30 from housing assembly 12. FIG. 8 depicts a perspective view showing tray assembly 30' of FIG. 3 in a rearward position beyond rear panel 18. Thus, in this case, the craftsman has access to splice trays (not shown) secured by bracket 42 from the rear of connector housing 10. FIGS. 10 and 11 depict a strain relief bracket assembly 100 of the present invention having a different configuration. FIG. 10 shows two strain relief bracket assemblies 100 attached to opposite sides of connector housing 10.

Figure 9:
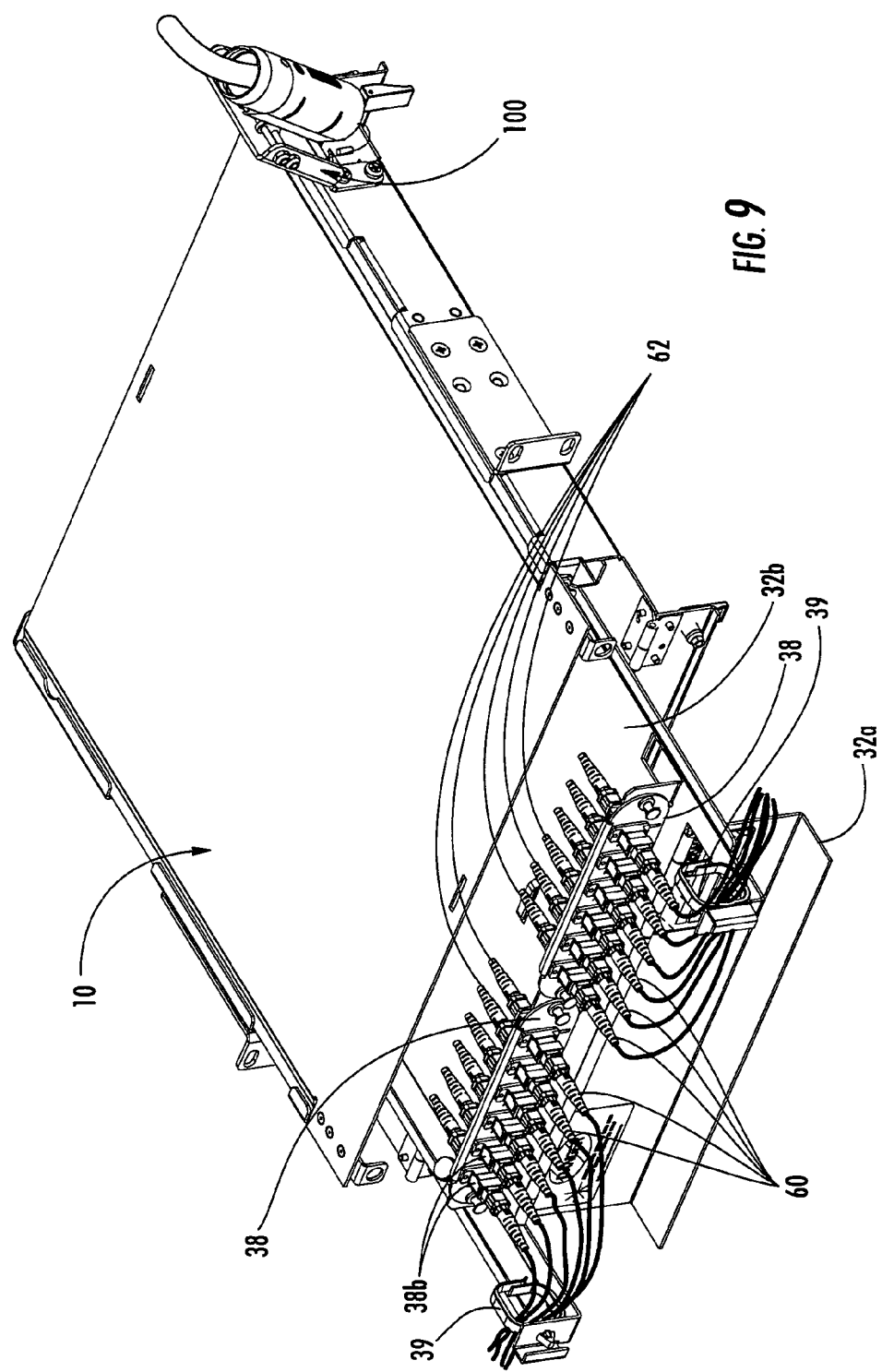
FIG. 9 is a front perspective view of the connector housing of FIG. 1 with the tray assembly including a plurality of connectors mounted thereto slid into a second forward position along with a portion of the tray hinged downward.

FIG. 9 depicts connector housing 10 with adapter panels 38 having a plurality of adapters 38b gang mounted thereto with tray 32 slid into the second forward position along with first portion 32a hinged downward. Adapters 38b are used for connecting and making optical connections between cables/optical waveguides at the front of the connector housing and the cables/optical waveguides at the rear of the rear of the connector housing. As depicted, a plurality of cables assemblies 60 are respectively connected at the front of respective adapters 38b. Likewise, cable assemblies 62 (only a portion of which are visible in FIG. 9) are connected at the rear of respective adapters 38b for optical communication with respective cable assemblies 60. FIG. 10 depicts the routing and slack storage of a cable assembly 62 secured by cable entry bracket assembly 100 and entering the connector housing. As shown, the slack of cable assembly 62 is wrapped about the plurality of slack cable storage devices 36. Additionally, tray includes tabs 32e that may be used for securing the cable assembly thereto using, for example, cable ties.

Many modifications and other embodiments of the present invention, within the scope of the appended claims, will become apparent to a skilled artisan. For example, the connector housing can have other configurations such as a larger height, thereby occupying more rack space. Additionally, the hingeable portion of the tray can be arranged to hinge when the tray assembly is in the rearward position or both the front and rear positions. Moreover, the tray assembly can have more or fewer lockable positions. Therefore, it is to be understood that the invention is not to be limited to the specific embodiments disclosed and that modifications and other embodiments may be made within the scope of the appended claims. Although specific terms are employed herein, they are used in a generic and descriptive sense only and not for purposes of limitation. The invention has been described with reference to an optical connector housing, but the inventive concepts of the present invention are applicable to other suitable communication networks as well.

That which is claimed:

1. A connector housing comprising:
a housing assembly having a front panel, a rear panel, and a bottom panel; and
a tray assembly, the tray assembly having a tray being slidably mounted relative to the housing assembly, the tray assembly having at least a first position within the housing assembly so that the tray assembly is fully inserted within the housing assembly and a second position where a portion of the tray assembly is extended from an interior of the housing assembly, wherein a first portion of the tray is hingably attached to a second portion of the tray so that the first portion of the tray is rotatable relative to the second portion of the tray when the tray is in the second position and the tray assembly is slidable in the rearward direction past the rear panel after the rear panel is rotated into the open position.

2. The connector housing of claim 1, the tray assembly having four positions where the tray assembly is capable of being locked into place in at least one direction.

3. The connector housing of claim 2, one of the four positions of the tray assembly being a rearward position, wherein a portion of the tray assembly extends beyond the rear panel.

4. The connector housing of claim 1, the tray assembly having more than two positions, wherein the positions of the tray assembly are locked into place in at least one direction.

5. The connector housing of claim 1, the tray assembly having at least one cable routing guide attached thereto for routing cables into the connector housing.

6. The connector housing of claim 1, the housing further comprising a top panel, wherein the top panel is removably attached to the housing assembly.

7. The connector housing of claim 1, further comprising a cable entry bracket attached to the housing assembly.

8. The connector housing of claim 7, further comprising a furcation plug of a cable assembly being attached to a mounting rail that is secured to the cable entry bracket.

9. The connector housing of claim 7, further comprising a furcation plug of a cable assembly being attached to a mounting rail that is an integrally formed portion of the cable entry bracket.

10. The connector housing of claim 1, the tray assembly having at least one slack cable storage device attached thereto for maintaining a predetermined minimum bend radius of a cable.

11. The connector housing of claim 1, the tray assembly having at least one bracket assembly for securing at least one splice tray.

12. The connector housing of claim 1, further comprising an adjustable rack-mount bracket.

13. A connector housing comprising:
a housing assembly having a front panel, a rear panel, and a bottom panel; and
a tray assembly, the tray assembly being slidably mounted relative to the housing assembly, the tray assembly having a first position so that the tray assembly is fully inserted within the housing assembly, the tray assembly having a second slidable position that extends from an interior of the housing assembly beyond the front panel, and the tray assembly having a third slidable position that extends from the interior of the housing assembly in the rearward direction past the rear panel.

14. The connector housing of claim 13, the tray assembly having a tray with a first portion of the tray that is hingably attached to a second portion of the tray so that the first portion of the tray is rotatable relative to the second portion of the tray.

15. The connector housing of claim 13, the tray assembly being lockable in at least the second and third positions in at least one direction.

16. The connector housing of claim 13, the tray assembly having at least one slack cable storage device attached thereto for maintaining a predetermined minimum bend radius of a cable.

17. The connector housing of claim 13, the tray assembly having at least one bracket assembly for securing at least one splice tray.

18. The connector housing of claim 13, the tray assembly having at least one cable routing guide attached thereto for routing cables into the connector housing.

19. The connector housing of claim 13, the housing assembly further comprising a top panel, wherein the top panel is removably attached to the housing assembly.

20. The connector housing of claim 13, further comprising a cable entry bracket attached to the housing assembly.

21. The connector housing of claim 20, further comprising a furcation plug of a cable assembly being attached to a mounting rail that that is secured to the cable entry bracket.

22. The connector housing of claim 20, further comprising a furcation plug of a cable assembly being attached to a mounting rail that is an integrally formed portion of the cable entry bracket.

23. The connector housing of claim 13, further comprising an adjustable rack-mount bracket.

24. A connector housing comprising:
  a housing assembly having a rotatable front panel, a rotatable rear panel, a bottom panel having opposite sides, and a removable top panel; and
  a tray assembly, the tray assembly being slidably mounted relative to the housing assembly, the tray assembly having at least a first position within the housing assembly so that the tray assembly is fully inserted within the housing assembly, and the tray assembly having a second position with a portion of the tray assembly extending beyond an interior of the housing assembly, wherein the tray assembly has a tray with a first portion of the tray being hingably attached to a second portion of the tray so that the first portion of the tray is rotatable relative to the second portion of the tray when the tray is placed in the second position.

25. The connector housing of claim 24, the tray assembly being slidable in the rearward direction past the rear panel after the rear panel is rotated into the open position.

26. The connector housing of claim 24, the tray assembly having four positions where the tray assembly is capable of being locked into place in one direction.

27. The connector housing of claim 24, the tray assembly having at least one slack cable storage device attached thereto for maintaining a predetermined minimum bend radius of a cable.

28. The connector housing of claim 24, the tray assembly having at least one bracket assembly for securing at least one splice tray.

29. The connector housing of claim 24, the tray assembly having at least one cable routing guide attached thereto for routing cables into the connector housing.

30. The connector housing of claim 24, further comprising a cable entry bracket attached to the housing assembly.

31. The connector housing of claim 30, further comprising a furcation plug of a cable assembly being attached to a mounting rail that is secured to the cable entry bracket.

32. The connector housing of claim 30, further comprising a furcation plug of a cable assembly being attached to a mounting rail that is an integrally formed portion of the cable entry bracket.

33. The connector housing of claim 24, further comprising an adjustable rack-mount bracket.

* * * * *